United States Patent [19]

Stamp, Jr. et al.

[11] 4,373,351

[45] Feb. 15, 1983

[54] CONTROL APPARATUS FOR AN AIR CONDITIONING SYSTEM PROVIDING A PLURALITY OF ENERGY-SAVING MODES OF OPERATION

[75] Inventors: Custis L. Stamp, Jr., Tyler, Tex.; Rollie R. Herzog, Louisville; Michael A. Brennan, Prospect, both of Ky.

[73] Assignee: Trane CAC, Inc., La Crosse, Wis.

[21] Appl. No.: 196,414

[22] Filed: Oct. 14, 1980

[51] Int. Cl.³ .................... F25B 13/00; F23N 5/20
[52] U.S. Cl. ........................... 62/160; 165/12; 236/46 R
[58] Field of Search ............ 236/46 R, 47; 165/12; 364/104, 557, 506; 219/492; 340/309.1; 62/160

[56] References Cited

U.S. PATENT DOCUMENTS

4,235,368 11/1980 Neel .................... 337/381 X

Primary Examiner—William E. Wayner

[57] ABSTRACT

A microprocessor based control for a heat pump system providing at least two setback temperature settings individually selected by the system user to be effective during different time periods of the day, also individually selectable by the user. In the event of conflicting setback temperature settings during an overlap in the selected time periods, the microprocessor is programmed to implement the setback temperature that provides the most energy efficient operation of the system. Additionally, the microprocessor automatically assures that any setback temperature settings are at least a minimum temperature differential away from the normal temperature setting in the more energy efficient direction. This override provision is effective whether the invalid setback temperature settings are initially inserted by the user or are the result of a subsequent change in the normal temperature setting.

8 Claims, 6 Drawing Figures

CONTROL APPARATUS FOR AN AIR CONDITIONING SYSTEM PROVIDING A PLURALITY OF ENERGY-SAVING MODES OF OPERATION

CROSS REFERENCE TO RELATED APPLICATIONS

This application is related to concurrently filed application Ser. Nos. 196,411, now U.S. Pat. No. 4,328,680; Ser. Nos. 196,412; 196,413; and 196,425, each filed jointly in the names of Custis L. Stamp, Jr. and Rollie R. Herzog, and each assigned to General Electric Company, the assignee of the present invention.

BACKGROUND OF THE INVENTION

This invention relates to automatic control apparatus for an air conditioning system and more specifically to such apparatus adapted to provide energy saving modes of operation during at least two different time periods in a 24 hour period. The present invention is particularly adapted for use with a heat pump air conditioning system capable of providing both heating and cooling operating modes to maintain a desired normal comfort level within the conditioned space.

It is well known in heating and cooling systems to provide control apparatus which will automatically adjust the system set point temperature during a portion of the day so as to use less energy than would be required to hold the conditioned space temperature at a normal or customary comfort level. For example, controls are commonly available that can be set to cause the set point temperature of a heating system to be set back to a lower temperature, either at night while the occupants of a residence are asleep or during the daylight hours while the occupants are away at work. Additionally, there is at least one control available that also permits temperature set back during two separate time periods in the day so as to cover both periods of absence. With this latter control the set back temperature is the same for both time periods.

It is, therefore, an object of the present invention to provide automatic control apparatus for an air conditioning system which will establish for two different time periods independent temperature settings which can be different for each time period thus permitting independent selection of the desired energy saving modes of operation.

It is a further object of the present invention to provide control apparatus particularly useful with a heat pump type of air conditioning system which will automatically raise or lower the set point temperature from the normal set temperature to independently selected different temperature settings for two different time periods of the day thus selectively providing, for example, different levels of energy saving modes of operation by day and night time periods.

It is a still further object of the present invention to provide control apparatus of the type described which will establish two energy saving modes of operation with respectively different setpoint temperatures during two different time periods of the day which time periods may have overlapping time segments wherein the control apparatus is adapted to select the most energy efficient mode of operation as determined by the respective set point temperatures for each of the overlapping time segments.

It is yet a further object of the present invention to provide control apparatus of the type described which will establish energy saving set point temperatures different from the normal temperature setting and which will automatically assure that at least a predetermined minimum differential in the energy saving direction is maintained between the normal and energy saving set point temperatures when a change in the normal temperature setting occurs.

SUMMARY OF THE INVENTION

Therefore, in accordance with the invention, there is provided, in an air conditioning system, control apparatus for automatically selecting and implementing, as a system set point operating temperature, a plurality of user-established temperature settings desired to be effective at different times of the day. The control apparatus comprises clock means for supplying a signal representative of actual time of day and further comprises user-operated data input and storage means for establishing a plurality of desired time and temperature settings at which the system is to operate. The data input and storage means includes first means for establishing a primary temperature setting to be effective during a desired normal operating mode of the system, second means for establishing at least two different energy saving time periods during which the system is to operate in energy saving operating modes, and third means for establishing secondary temperature settings capable of being different from each other to be effective during each of the energy saving time periods. The control apparatus of the invention further comprises mode control signal generation means responsive to the clock means and to the data input and storage means for establishing control signals representative of any energy saving time period extant at the time of day involved. The apparatus further includes temperature control signal generation means responsive to the data input and storage means and to the mode control signal generation means for establishing a system set point temperature control signal representative of the primary temperature setting when the time of day is outside the energy saving time periods and of one of the secondary temperature settings when the time of day is within an energy saving time period. Finally, the control apparatus of the invention includes system functional operating control means responsive to the data input and storage means and to the temperature control signal generation means for operating the system to the system set point temperature indicated by the temperature control signal.

In accordance with one particular aspect of the invention, the data input and storage means is capable of establishing two time periods having overlapping time segments and the mode control signal generation means is adapted to establish control signals representative of the coexistence of both energy saving time periods at the time of day involved and the temperature control means is adapted to select and establish the control signal which is representative of the most energy efficient temperature setting extant during the overlapping time segments.

In a further aspect of the invention, means are provided for assuring that energy saving temperature settings are maintained at a level which is at least a minimum predetermined temperature differential away from the primary temperature setting and, if necessary, automatically changing the energy saving temperature setting to meet this minimum criterion.

DETAILED DESCRIPTION OF THE INVENTION

Figure 1:
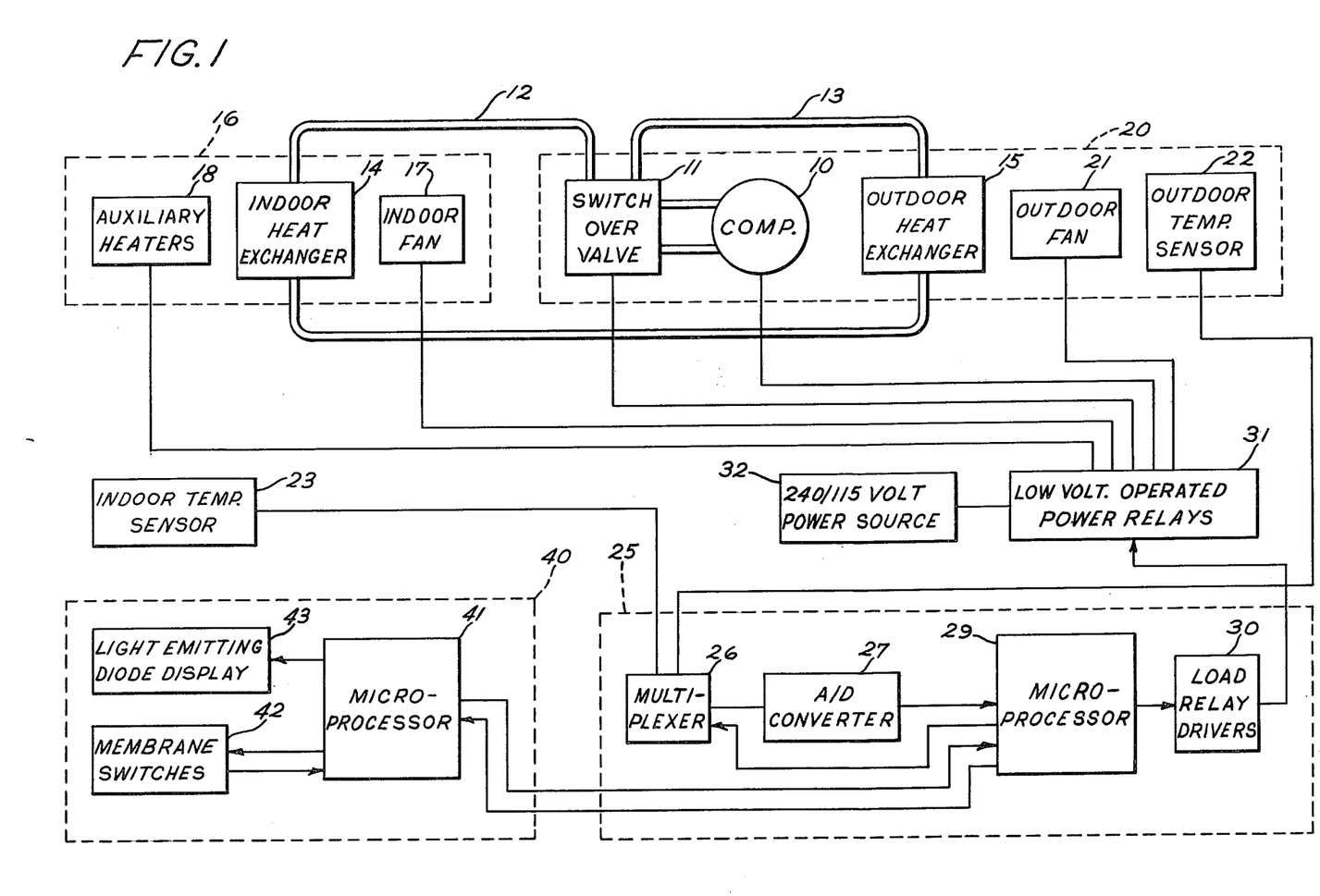
FIG. 1 is a simplified schematic representation of a heat pump system embodying automatic control apparatus of the present invention.

Referring now to FIG. 1 there is shown in simplified schematic form a heat pump type of air conditioning system including a compressor 10 connected through a switch-over valve 11 and by means of refrigerant lines 12 and 13, respectively, to indoor and outdoor heat exchangers 14 and 15. The indoor unit 16 of the system also includes an indoor fan 17, to circulate air through the conditioned space, and auxiliary heaters 18 to provide supplemental heat during extremely cold days. In addition to the compressor 10, switch-over valve 11 and heat exchanger 15, the outdoor unit 20 also includes an outdoor fan 21 to circulate air through the coils of the heat exchanger. Since all of the components of the indoor and outdoor units 16 and 20 are conventional in structure and operation, no further details need be provided for a proper understanding of the invention.

The system functional operation of the heat pump components just described is controlled in the system of FIG. 1 by means of a microprocessor based system controller 25. To this end, microprocessor 29 may be suitably programmed in well known manner to control the operation of low voltage relays 31 via relay driver amplifiers 30 to apply power from source 32 to appropriate components of the heat pump system at the proper times. Input intelligence to microprocessor 29 in the form of temperature readings are supplied from indoor temperature sensor 23, which may comprise one or more temperature dependent thermistors, and outdoor temperature sensor 22, which may also be a temperature dependent thermistor, via multiplexer 26 and analog to digital converter 27. In addition, system operating control signals, including signals representative of set point temperature settings at which the heat pump system is to operate from time to time, are received from system console 40.

System console 40 serves as the primary interface between the user and the heat pump system and is therefore preferably located at a convenient position within the conditioned space for easy access by the user in order to provide selective control over the functional operation of the system. Temperature sensor 23 may also be included within the structure of console 40 although this is not essential. Input of control data is effected by means of membrane switches 42 while visual readout of time and temperature information is effected by means of a light-emitting diode display 43. Console 40 also includes a microprocessor 41 which is programmed to interrelate the data inserted by the user via switches 42 with the various functions needed to operate the heat pump system of FIG. 1. More specifically, in accordance with the invention, microprocessor 41 is programmed to convert the data inserted by the user into control signals communicated to system controller 25 which are representative of a plurality of temperature settings desired to be effective at different times of the day. The circuit details of the system controller 25 and of the system console 40 with the input and output devices associated therewith are shown more fully in the disclosures of the aforementioned cross-referenced applications Ser. No. 196,413 entitled "Automatic Control Apparatus for a Heat Pump System" and Ser. No. 196,425 entitled "Microcomputer control for a Heat Pump System," the disclosures of which are expressly incorporated herein by reference.

Figure 2:
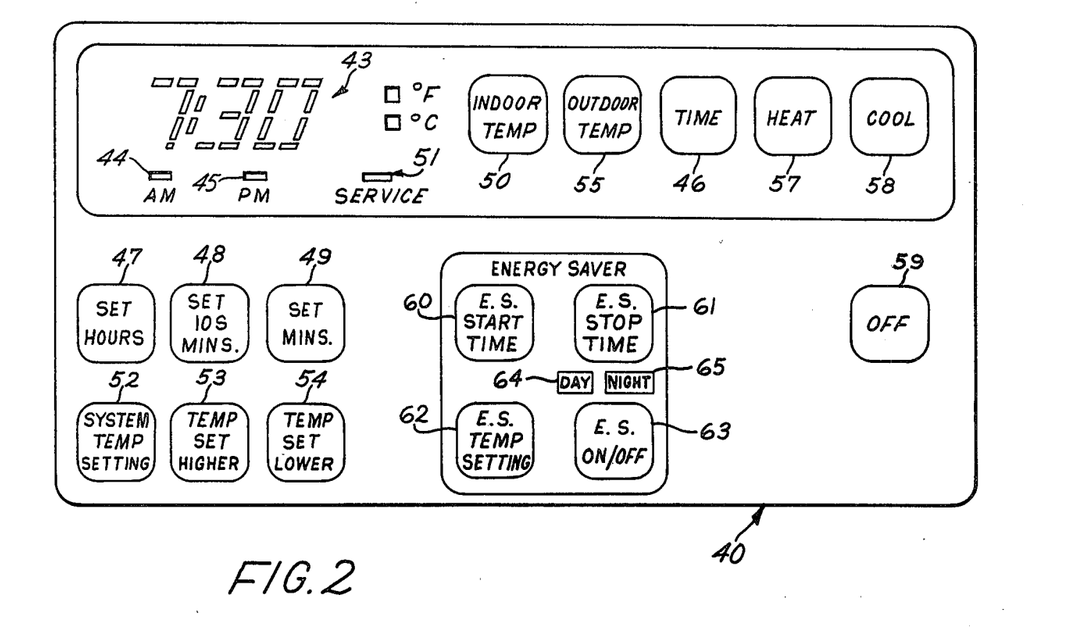
FIG. 2 illustrates a control panel layout for switches and readout devices embodied in the user-operated system console of FIG. 1.

To provide "real time" control of the heat pump system, a portion of the program for microprocessor 41 serves as clock means to provide a control signal representative of actual time of day. Referring to FIG. 2, AM or PM for the time of day is indicated by lighting the appropriate LED indicator 44 or 45. To set the time in the clock portion of the microprocessor 41 and on the display 43 the user depresses the "time" switch 46. If a temperature reading was previously being displayed, this would cause the time reading to appear in place of the temperature reading. The user then sets the appropriate time by operation of the set hours and minutes switches 47–49.

The desired time and temperature settings at which the heat pump system of FIG. 1 is to operate are established in microprocessor 41 as follows: depression of the "system temp setting" button 52 causes the set point temperature to be displayed on the display 43. Microprocessor 41 is programmed to hold this set point temperature display for a predetermined time, for example, one minute, during which the user may set or change the set point for the primary room temperature setting to be effective during a desired normal operating mode of the heat pump system. This is accomplished by depressing the appropriate buttons 53 or 54 to raise or lower the set point temperature setting as desired.

Before considering the manner in which energy saving settings are established in accordance with the invention, it may be noted that sensed outdoor temperature can be displayed by depressing "outdoor temp" button 55 and, alternatively, sensed indoor temperature can be displayed by depressing "indoor temp" button 50. Also the basic functional operating modes of "heat" and "cool" are selected by depressing the appropriate switches 57 or 58, respectively. Depressing "off" switch 59 disables the functional operation of the heat components and turns off all LED's, except a "service" LED 51 if previously on. Service LED 51 is activated in accordance with the teachings of aforementioned application Ser. No. 196,412 to indicate the existence of a malfunction in the system requiring a service call to correct. The microprocessors 41 and 29 continue to recycle through their respective "off" programs so long as operating power is applied to the units.

In accordance with a particular feature of the invention, "energy saver" buttons 60–63 are provided to establish a plurality of selected temperature settings different from the primary temperature setting at which the system is to operate during selected time periods in the day at which time it is desired to conserve energy usage by the heat pump system. Thus, depression of "ES on/off" button 63 conditions the program in microprocessor 41 to cause the set point temperature communicated to microprocessor 29 to change to the selected energy saving temperature which the user has selected to be effective during the selected time periods of the day. In the system of FIGS. 1 and 2 the first depression of switch 63 activates a first or "day" time period as indicated by the "day" LED 64. Depressing switch 63 again causes the system to activate a second or "night" time period in the control program of microprocessor 41 as indicated by the "night" LED 65. A third depression of switch 63 activates both the "day" and "night" energy saving time periods in the system. Energy saving operation of the system is disabled or turned off by a fourth depression of switch 63.

When either one of the "day" or "night" energy saving operations is established in the system to the exclusion of the other, as determined by the operation of switch 63 and as indicated by either of lights 64 or 65, the set point temperature for the corresponding energy saving operation for the selected operation can be established by depressing "ES temp setting" button 62 and the appropriate one of buttons 53 and 54. If either one of the energy saving operations has not been established in the system or, alternatively, if both energy saving operations have been established simultaneously by the aforesaid third depression of switch 63, the energy saving set point temperatures may not be changed or displayed. In accordance with one aspect of the invention, the program in microprocessor 41 operates to maintain an energy saving set point temperature which is always in the direction of more energy efficient operation than exists at the primary temperature setting used during normal operation of the system in the "heat" or "cool" mode and which is always at least a minimum predetermined differential away from the primary temperature setting. For example, a temperature differential of at least about 1° C. (or about 2° F., the two values being approximately the same for purposes of this invention) may be maintained between the primary and energy saving set point temperatures and, if the system is in the "cool" mode, this differential is above the primary temperature setting while, if in the "heat" mode, the differential is maintained below the primary temperature setting. This feature assures that a user cannot inadvertently select an energy saver temperature setting that provides less efficient operation than exists at the primary temperature setting. It also assures that, if one or more energy saving modes has been established and the primary temperature setting is subsequently changed to a value that would defeat the energy saving mode operation, the controller will adjust automatically to preserve at least a minimum level of energy saving operation during the selected energy saving mode time periods.

Having established the desired time and temperature settings at which the system is to operate, the manner in which the program of microprocessor functions to establish the necessary control signals for communication to microprocessor 29 in controller 25 will now be considered with reference to FIGS. 3-6.

Figure 3:
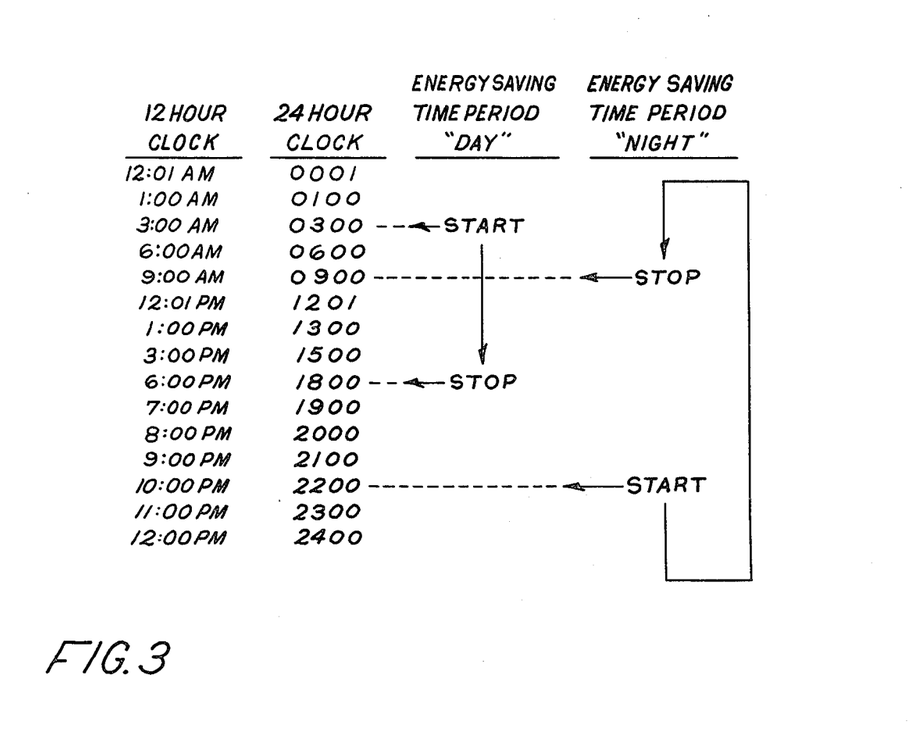
FIG. 3 is a time chart useful in explaining the operation of the present invention.

The chart of FIG. 3 illustrates the relationship of the 24 hour clock on which the clock means of microprocessor 41 is based to the 12 hour clock. The third and fourth columns of the chart show representative start and stop times for the "day" and "night" energy saving time periods. Thus, in the illustrated example, the "day" energy saving time period commences at 3 AM (300 hours) and stops at 6 PM (1800 hours) while the "night" energy saving time period commences at 10 PM (2200 hours) and continues into the following morning until 9 AM (900 hours). It is possible for the user to establish the time periods with overlapping time segments and for purposes of explaining the present invention a 3 hour overlapping time period is illustrated in FIG. 3.

Figure 4:
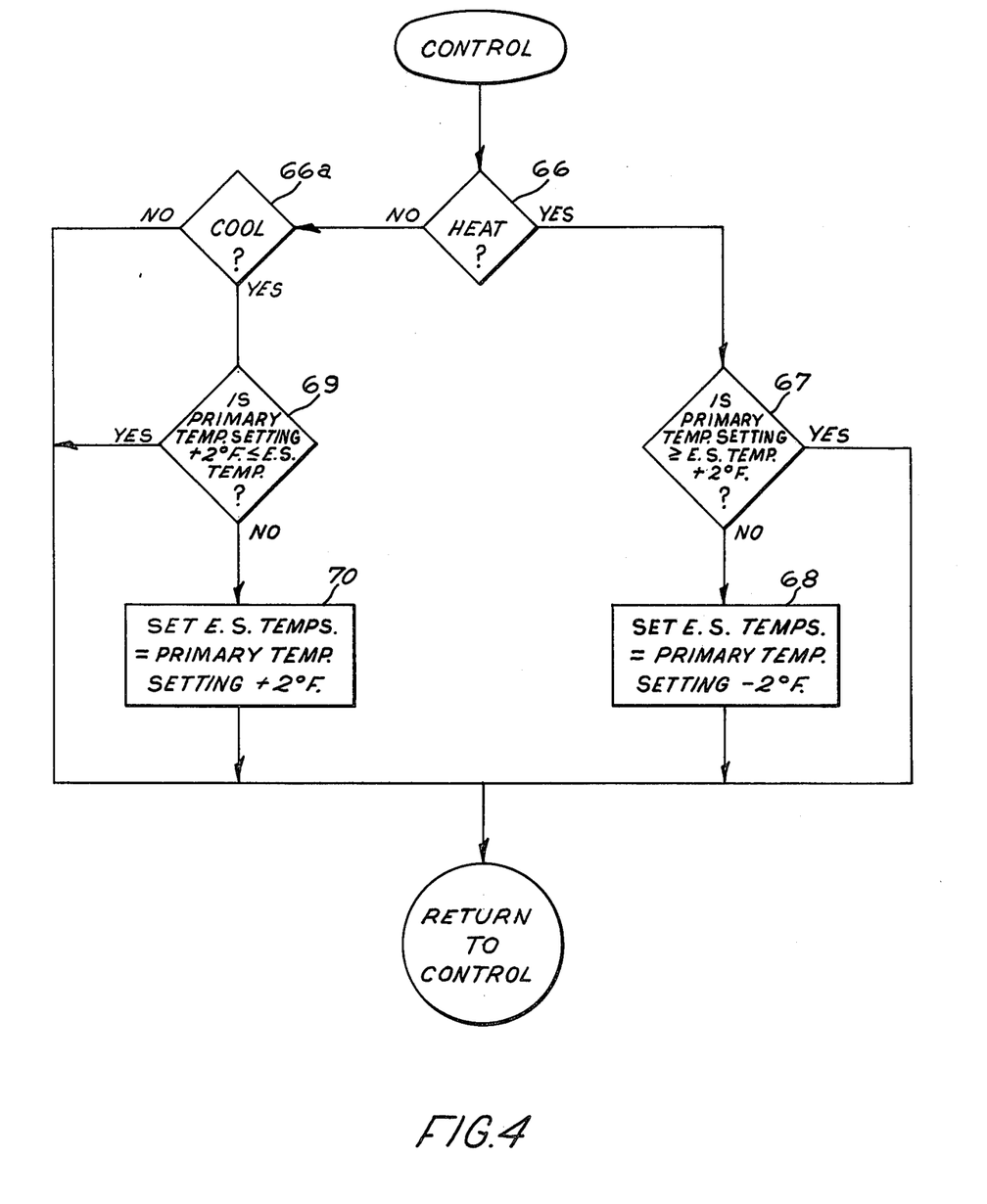
FIGS. 4–6 are computer program flow diagrams for the system console microprocessor of FIG. 1 and useful in explaining the operation of the present invention.
Figure 5:
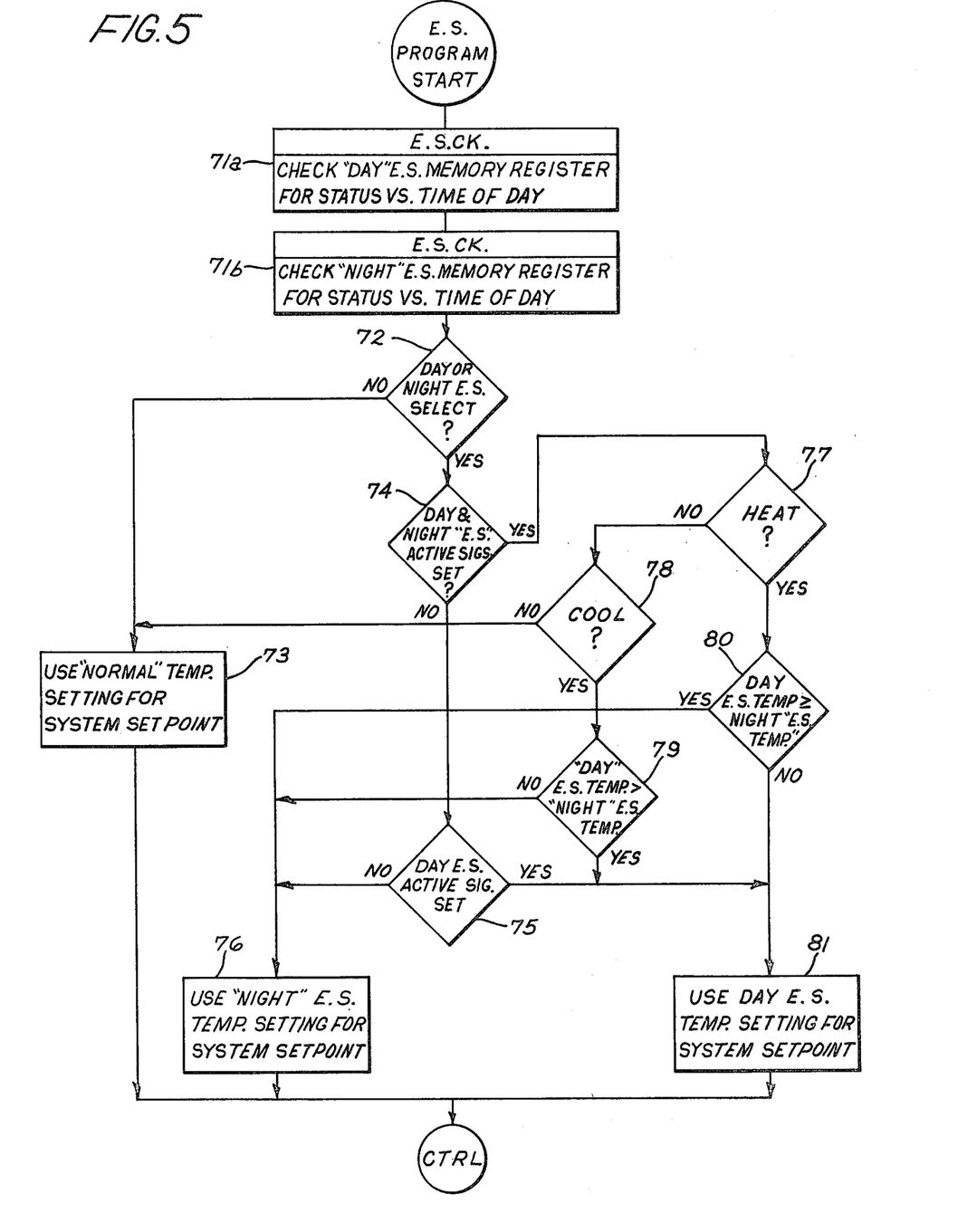
Figure 6:
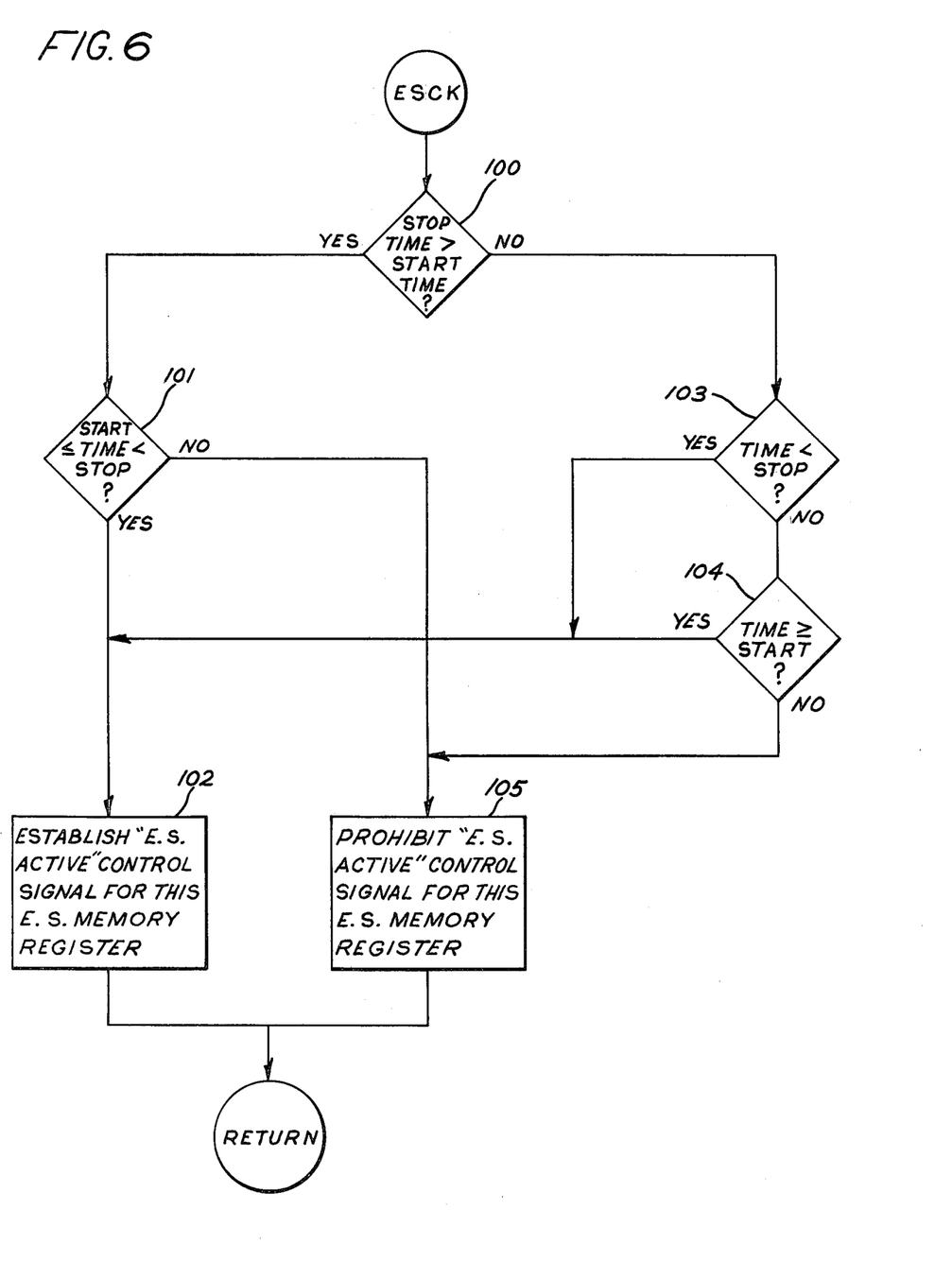

Referring now to FIGS. 4-6, there will now be considered the program flow diagrams applicable to the preprogrammed microprocessor 41 used to control the heat pump system in the energy saving modes of operation. To best describe the overall operation of the control apparatus in the performance of the energy saving aspect of the present invention, it will be assumed that the user has depressed the energy saver on/off button 63 three times to activate both the day and night modes of operation in the system as previously explained. At an appropriate point in the main control program in microprocessor 41, such as during one of a series of data checking subroutines, the program initiates a subroutine corresponding to the flow chart shown in FIG. 4 to check the consistency of the secondary energy saving temperature settings versus the primary room temperature setting, each of which would have normally been inserted by the user as previously described. The purpose of this check subroutine is to determine whether the stored temperature settings are such as will, in fact, result in energy saving operation during the selected energy saving modes. Thus, from the control program, the enquiry 66 determines whether the system is set in the heat mode and, if yes, enquires in block 67 whether the primary temperature setting stored in the console memory is greater than or equal to the stored energy saving temperature settings plus, in each case, a minimum temperature differential such as, for example, 2° F. As an example, if the primary temperature is set for 70° F., any energy saving temperature of 68° F. or below would satisfy this criterion. Each energy saving temperature setting must be checked in sequence and if both or all energy saving temperature settings satisfy this criterion, the subroutine returns to the main control program. On the other hand, for each energy saving temperature setting that does not satisfy this criterion, the program instruction block 68 causes the corresponding stored energy saving temperature setting to be automatically changed to the minimum 2° F. temperature differential below the primary temperature setting, i.e. in the more energy efficient direction in the case of heat operation. It is possible to preserve the initial user-established differential; however, in an actually constructed embodiment, the minimum 2° F. differential is automatically reverted, regardless of the initial differential.

Assuming enquiry block 66 determines that the system is not in the heat mode, enquiry 66a then determines whether the system is in the cool mode. If not, the subroutine is terminated and returns to the main control program. Assuming the system is in the cool mode, enquiry block 69 then determines whether the energy saving temperature setting satisfies the minimum criterion of being equal to or higher than the primary temperature setting. This, of course, would be in the more energy efficient direction in the cool operating mode. If the setting does not meet this criterion, instruction block 70 causes the appropriate energy saving temperature settings to be changed automatically so as to satisfy the predetermined minimum temperature differential in the correct direction for more energy efficient operation during the energy saving mode. While a differential of 2° F. is established in the system being described, it will be appreciated that this is only one preferred value and that another value might also be used. However, values less than 2° F. probably would not result in an effective amount of energy saving.

Referring to FIG. 5, at a subsequent appropriate time in the programmed operation of microprocessor 41, the microprocessor enters into the energy saving program start operation and, in accordance with instruction block 71a, enters into an energy saving check routine shown in FIG. 6. Upon entering this subroutine, the program initiates the first inquiry 100 whereby the data stored in a first memory register corresponding to the "day" time saving period is interrogated to determine if the stop time is greater than the start time. If it is, the time of day is called from the clock means and inquiry 101 is made to determine if the time of day is within the start and stop times of the energy saving time period. Assuming it is, the program then initiates instruction 102 to establish the "energy saving active" control signal corresponding to this memory register and returns to the energy saving program of FIG. 5. At this point, instruction block 71b, the program is caused to reenter the energy saving check subroutine of FIG. 6 wherein the memory register for the night energy saving time period data is interrogated to determine if the stop time is greater than the start time, instruction block 100. Assuming the user has established the start and stop times for night operation as shown in FIG. 3, the answer will be no and the program then inquires in block 103 with reference to the clock means whether the time of day is less than the established stop time. if the answer is yes, this indicates that the system is operating in the early AM portion of the night energy saving time period and thus the program initiates an instruction to establish the energy saver active control signal for this second memory register. If the time of day is greater than the stop time, the program initiates a second inquiry, block 104, to determine if the time of day is greater than or equal to the start time period since a yes indicates the system is operating in the late PM hours of the time period and, therefore, establishes an energy saving active control signal. If the answer is no on this second inquiry, the time of day falls outside of the night energy saving time period for this memory register and the program enters an instruction in block 105 to prohibit the energy saving active control signal. Following the initiation of either of these instructions, the program returns to the energy saving program of FIG. 5.

Having established that the time of day falls within one of the energy saving program time periods, the program then inquires in block 72 whether the user has in fact selected, by operation of switch 63, either the "day" or "night" energy saving operation. If not, the program moves on to an instruction 73 to use the normal temperature setting as the system set point and the program then returns to the main system functional operation control program. If either the "day" or "night" energy saving mode program has been selected, the program moves on to inquiry 74 to determine whether both "day" and "night" energy saving active signals have been established as a result of the operation of the program subroutine corresponding to the flow diagram of FIG. 6. The purpose of this inquiry is to determine whether the time of day falls between overlapping time segments of the two energy saving time periods for a purpose described below. If not in overlapping time segments, the program then moves on to inquiry 75 to determine whether the "day" energy saving active signal has been established. If it has not, this, of course, means that the time of day is exclusively within the "night" energy saving time period and thus the program enters instruction 76 to use the "night" energy saving temperature setting as the system set point.

If, in inquiry 74, it is determined that the time of day falls within overlapping time segments of the two energy saving time periods, it is a further feature of the present invention that means are provided to determine which would be the most energy efficient operation of the system and to enter into that mode of operation. To this end, an affirmative answer to inquiry 74 moves the program to inquiry 77 to determine if the system should be operating in the "heat" functional operating mode. If yes, inquiry 80 determines whether the energy saving temperature setting for the "day" energy saving time period is higher than or the same as the "night" energy saving temperature setting. If it is, then the program enters the instruction 76 to use the "night" energy saving temperature setting for the system set point operation. This is because, in the case of the lower set point temperature in the "heat" operating mode, the lower temperature represents a more energy efficient mode of operation than the higher temperature. If the energy saving set point temperature established for the "day" energy saving time period is lower than the "night" energy saving temperature setting, the program enters the instruction 81 to use the "day" energy saving temperature setting for the system set point. Considering again inquiry 77, if the system is not in the "heat" mode of operation, the program then enters inquiry 78 to determine whether the system is in the "cool" mode of operation and if so, inquiry 79 then determines, in a manner similar to that used in the case of the "heat" mode, which energy saving temperature setting is to be used and enters the appropriate one of instructions 76, 81. In this way, the system is assured of using the most energy efficient mode of operation. If inquiries 77 and 78 determine that the system is not in either heat or cool, the instruction is entered to use the normal temperature setting. In reality, this has no meaning since the refrigerant compressor portion of the system is not operating, but it nonetheless serves as a means for returning the energy saving program to the main system operating program.

At the conclusion of either energy saving period, the system will revert to the primary or normal room temperature setting as described above. This change may be caused to occur immediately, i.e. the system directly uses the room temperature setting as the set point temperature with the appropriate heat or cool function engaged to reach this set point temperature in the shortest possible time. Alternatively, to optimize the benefits of the energy saving operation, the system may be programmed in accordance with the teachings of aforementioned Application Ser. No. 196,425 to approach the primary room temperature in a controlled manner to avoid excessive energy usage, such as, for example, caused by overshoot in the room temperature in reaching the room set point temperature than is actually needed.

While, in accordance with the patent statutes, there has been described what at present is considered to be the preferred embodiment of the invention, it will be obvious to those skilled in the art that various changes and modifications may be made therein without departing from the invention. It is, therefore, intended by the appended claims to cover all such changes and modifications as fall within the true spirit and scope of the invention.

What is claimed is:

1. In an air conditioning system, control apparatus for automatically selecting and implementing, as a system set point operating temperature, a plurality of user-established temperature settings desired to be effective at different times of the day, said control apparatus comprising:
   (a) clock means for supplying a signal representative of actual time of day;
   (b) user-operated data input and storage means for establishing a plurality of desired time and temperature settings at which the system is to operate including,
      (i) first means for establishing a primary temperature setting to be effective during a desired normal operating mode of the system,
      (ii) second means for establishing at least two different energy saving time periods during which the system is to operate in energy saving operating modes,
      (iii) third means for establishing a plurality of secondary temperature settings capable of being respectively different from each other to be effective during each of said energy saving time periods;
   (c) mode control signal generation means responsive to said clock means and to said data input and storage means for establishing control signals representative of any energy saving time period extant at the time of day involved;
   (d) temperature control signal generation means responsive to the data input and storage means and to the mode control signal generation means for establishing a system set point temperature control signal representative of said primary temperature setting when the time of day is outside said energy saving time periods and of one of said secondary temperature settings when the time of day is within an energy saving time period corresponding thereto;
   (e) and system functional operating control means responsive to the data input and storage means and to the temperature control signal generating means for operating the system to the system set point temperature indicated by said temperature control signal.

2. The automatic control apparatus of claim 1 wherein said secondary temperature settings are each different from said primary temperature setting in a more energy efficient direction by at least a minimum predetermined temperature differential.

3. The automatic control apparatus of claim 2 wherein said minimum differential is at least approximately one degree Centigrade or approximately two degrees Fahrenheit.

4. The automatic control apparatus of claim 1 wherein said second user-operated means permits establishment of two energy saving time periods with overlapping time segments and wherein said mode control means establishes control signals representative of the existence of both energy saving time periods at the time of day involved and wherein said temperature control means selects and establishes the control signal which is representative of the most energy efficient temperature setting during said overlapping time segments.

5. The control apparatus of claim 2 wherein additional means are included responsive to a change in primary temperature setting at said first user-operated means to a new setting which is different from said secondary temperature setting during one of said energy saving modes by an amount less than said predetermined minimum temperature differential or which results in said secondary temperature being in a less energy efficient direction from said primary temperature setting to automatically cause said secondary temperature setting to be changed so as to maintain at least said predetermined minimum differential in said more energy efficient direction.

6. In a heat pump type of air conditioning system, control apparatus for automatically selecting and implementing, as a system set point operating temperature, a plurality of user-established temperature settings desired to be effective at different times of the day, said control apparatus comprising:
   (a) clock means for supplying a signal representative of actual time of day;
   (b) user-operated data input and storage means for establishing system control signals representative of system functional operating modes including "heat", "cool" and "off" and for establishing a plurality of desired time and temperature settings at which the system is to operate including;
      (i) first means for establishing a primary temperature setting to be effective during a desired normal operating mode of the system,
      (ii) second means for establishing two different energy saving time periods during which the system is to operate in energy saving operating modes, it being possible for said time periods to have overlapping time segments,
      (iii) third means for establishing, for each of said time periods, secondary temperature settings to be effective during each of said energy saving time periods, which settings are different from said primary temperature setting and also are capable of being different from each other and which correspond to said energy saving modes;
   (c) mode control signal generation means responsive to said clock means and to said data input and storage means during said overlapping time segments of said energy saving time periods for establishing control signals representative of the coexistence of said energy saving time periods at the time of day involved;
   (d) temperature control signal generation means responsive to the data input and storage means and to the mode control signal generation means for establishing a system set point temperature control signal representative of the higher of the two secondary temperature settings when the system is in the "cool" operating mode and the lower of the two secondary temperature setting when the system is in the "heat" operating mode, said setpoint temperature control signal being established at least for the duration of said overlapping time segments;
   (e) and system functional operating control means responsive to the data input and storage means and to the temperature control signal generating means for operating the system to the system setpoint temperature indicated by the temperature control signal.

7. The heat pump system control apparatus of claim 6 wherein said secondary temperature settings are each different from said primary temperature setting in a more energy efficient direction by at least a minimum predetermined temperature differential.

8. The heat pump system control apparatus of claim 7 wherein means are included responsive to a change in primary temperature setting at said first user-operated means to a new setting which is different from said secondary temperature setting during one of said energy saving modes by an amount less than said predetermined minimum temperature differential or which results in said secondary temperature being in a less energy efficient direction from said primary temperature setting to automatically cause said secondary temperature setting to be changed so as to maintain at least said predetermined minimum differential in said more energy efficient direction.

* * * * *